(12) United States Patent
Handshaw et al.

(10) Patent No.: US 11,861,994 B2
(45) Date of Patent: *Jan. 2, 2024

(54) COMPACT SELF-CHECKOUT KIOSKS

(71) Applicant: ZEBRA TECHNOLOGIES CORPORATION, Lincolnshire, IL (US)

(72) Inventors: Darran Michael Handshaw, Sound Beach, NY (US); Edward Barkan, Miller Place, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/958,729

(22) Filed: Oct. 3, 2022

(65) Prior Publication Data
US 2023/0029122 A1 Jan. 26, 2023

Related U.S. Application Data

(63) Continuation of application No. 16/888,070, filed on May 29, 2020, now Pat. No. 11,462,082.

(51) Int. Cl.
*G07G 1/00* (2006.01)
*G07G 1/12* (2006.01)
*G06K 7/14* (2006.01)

(52) U.S. Cl.
CPC ......... *G07G 1/0045* (2013.01); *G06K 7/1413* (2013.01); *G07G 1/0027* (2013.01); *G07G 1/12* (2013.01)

(58) Field of Classification Search
CPC .. G06K 7/1096; G06K 7/1413; G07G 1/0018; G07G 1/0027; G07G 1/0045; G07G 1/12; G06Q 20/20; G06Q 20/208
USPC ..................................... 235/383; 705/16, 17
See application file for complete search history.

(56) References Cited

U.S. PATENT DOCUMENTS 11,126,809 B2 * 9/2021 Drzymala ............ G06K 7/1096
2004/0238637 A1 * 12/2004 Russell ..................... G07F 7/02
235/462.14

* cited by examiner

*Primary Examiner* — Suezu Ellis
(74) *Attorney, Agent, or Firm* — Yuri Astvatsaturov

(57) ABSTRACT

A kiosk includes a kiosk housing, a barcode reader, a receipt printer, a display unit, and a processor communicatively coupled to the barcode reader, receipt printer, and display unit. The kiosk has a reader housing having a lower housing portion with an upper surface facing a product scanning region and an upper housing portion extending above the lower housing portion, a horizontal window positioned at the upper surface of the lower housing portion and configured to allow a first light to pass between the product scanning region and an interior region of the reader housing, and an upright window positioned in the upper housing portion and configured to allow a second light to pass between the product scanning region and the interior region of the reader housing.

9 Claims, 15 Drawing Sheets

COMPACT SELF-CHECKOUT KIOSKS

CROSS-REFERENCE TO RELATED APPLICATION

This application is a continuation of U.S. patent application Ser. No. 16/888,070, filed on May 29, 2020, and incorporated herein by reference in its entirety.

FIELD OF THE DISCLOSURE

The present patent relates generally to self-checkout kiosks and, in particular, to compact self-checkout kiosks and rotatable and convertible compact self-checkout kiosks.

BACKGROUND

Self-checkout kiosks and other kiosks that use barcode readers are becoming more prolific in retail environments as many stores attempt to free up employees for other tasks. The purpose of these kiosks is two-fold: to help the stores redirect their employees to perform other important tasks and to help customers get what they need more quickly, whether that be to place an order, or checkout of a store. However, many stores don't have the real estate or space to install many of the present self-checkout kiosks due to their large size (even the smaller of the present kiosks having an 18 inch width and taking up a large amount of counter space). This requires smaller stores to retrofit existing counter space and potentially reduces the number of checkout lanes in the process. Therefore, it would be beneficial if there were a smaller form factor of kiosk that could help stores more easily integrate the kiosks into their existing points-of-sale without the modification of existing counter spaces.

In addition, larger stores can have allocated space specifically for self-checkout kiosks in addition to traditional checkout lanes, but smaller stores don't have the needed real estate. Therefore, smaller stores can be required to take a risk by removing traditional checkout lanes to make space for self-checkout, which may or may not be received well by their customers. Therefore, it would be beneficial to have a kiosk that can easily and quickly convert from a traditional cashier point-of-sale to a self-checkout kiosk on the fly without bulky and complicated mechanisms. This gives stores a flexible space that can be rapidly adapted based on the number of employees, the tasks that need to be done in the store, and the demand of customers.

SUMMARY

In an embodiment, the present invention is a kiosk comprising a kiosk housing, a barcode reader, a receipt printer, a display unit, and a processor communicatively coupled to the barcode reader, the receipt printer, and the display unit. The kiosk housing has a width less than or equal to 6¾ inches and the barcode reader, receipt printer, and processor are within the kiosk housing. The barcode reader comprises a reader housing, an imaging assembly within the reader housing, a window in the reader housing configured to allow a light to pass between a product scanning region and an interior region of the reader housing, and a set of optical components positioned within the interior region and configured to direct a field-of-view of the imaging assembly through the window.

In another embodiment, the present invention is a kiosk comprising a kiosk housing, a barcode reader, a receipt printer, a display unit, and a processor communicatively coupled to the barcode reader, receipt printer, and display unit. The kiosk has a width less than or equal to 9 inches and the barcode reader, receipt printer, and processor are within the kiosk housing. The barcode reader comprises a reader housing having a lower housing portion with an upper surface facing a product scanning region and an upper housing portion extending above the lower housing portion, a generally horizontal window positioned at the upper surface of the lower housing portion and configured to allow a first light to pass between the product scanning region and an interior region of the reader housing, a generally upright window positioned in the upper housing portion and configured to allow a second light to pass between the product scanning region and the interior region of the housing. The reader housing has a width that is greater than or equal to 5 inches and less than or equal to 7½ inches, the lower housing portion has a height that is greater than or equal to 3 inches, the upper housing portion has a height that is greater than or equal to 4 inches and less than or equal to 6 inches, and the upper surface of the lower housing portion has a length between a proximal edge adjacent the upper housing portion to a distal edge, opposite the proximal edge, that is greater than or equal to 6 inches and less than or equal to 8 inches.

In yet another embodiment, the present invention is an assembly comprising a rotatable base and a kiosk mounted to the rotatable base. The kiosk includes a kiosk housing, a barcode reader within the kiosk housing, a receipt printer within the kiosk housing, a display unit, and a processor within the kiosk housing and communicatively coupled to the barcode reader, the receipt printer, and the display unit. The kiosk is rotatable with the rotatable base without any vertical movement of the kiosk.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

Figure 1:
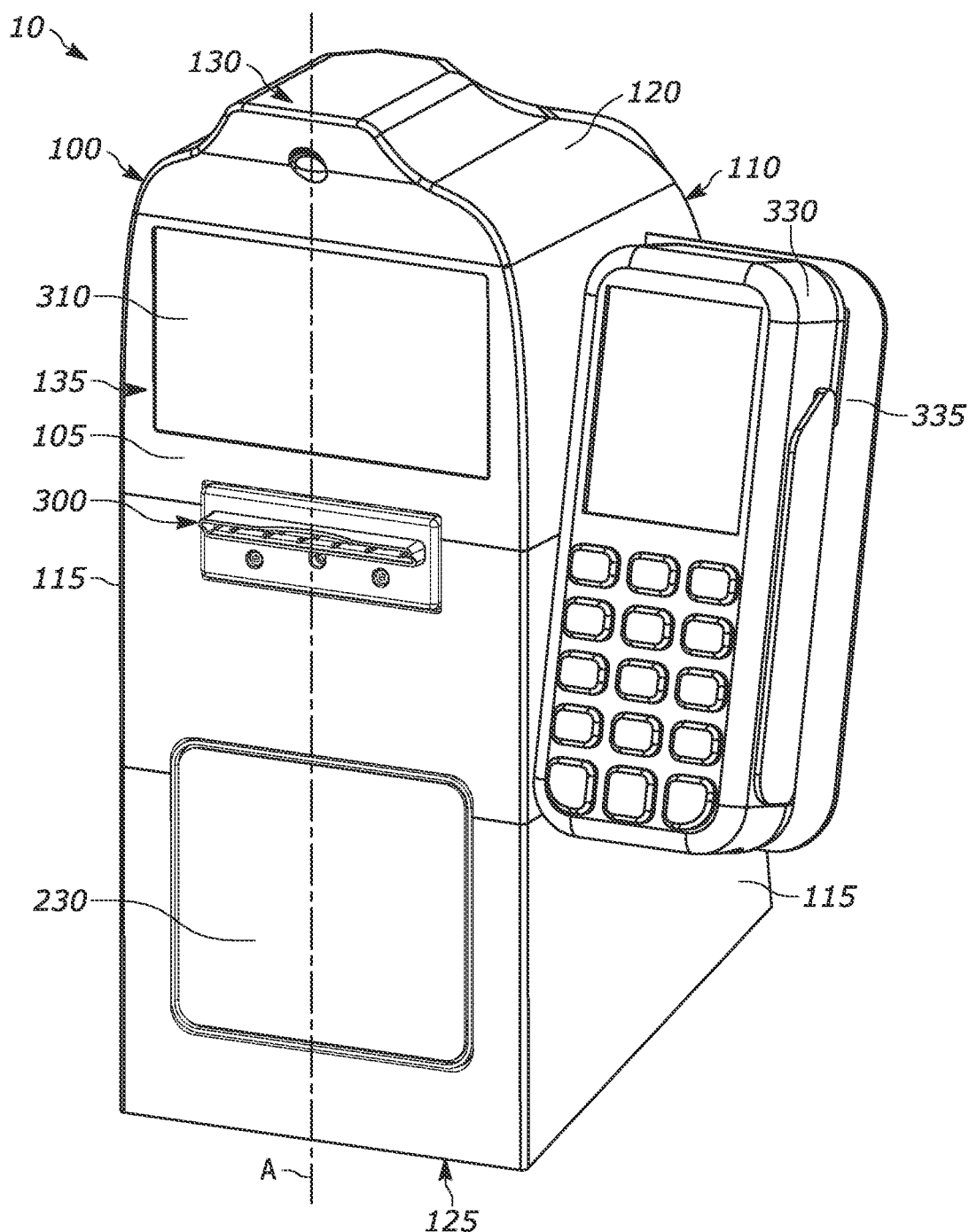
FIG. 1 illustrates a perspective view of a first example kiosk.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

The example kiosks described herein provide smaller, compact kiosks that have a minimum footprint, where the width of the kiosk is driven primarily by the size of the barcode reader used in the particular kiosk. These example kiosks have all the electronics required contained in a single compact housing and can more easily be integrated into existing point-of-sale or counter spaces with minimal changes required and are easily adaptable to fit on pedestals. The smaller size of the example kiosks also allows for easier shipping and serviceability. For example, unlike many current kiosks, the example kiosks herein can be swapped out when they need service in order to keep the checkout lane open and serviced remotely.

In addition, the example kiosks can be mounted onto a rotatable base, which allows the kiosks to function as a self-checkout kiosk and a traditional point-of-sale kiosk. The example kiosks can be easily rotated to face an employee or a customer, depending on the need, and can be configured to perform specific operations or allow specific functionality depending on the position of the kiosks.

Figure 2:
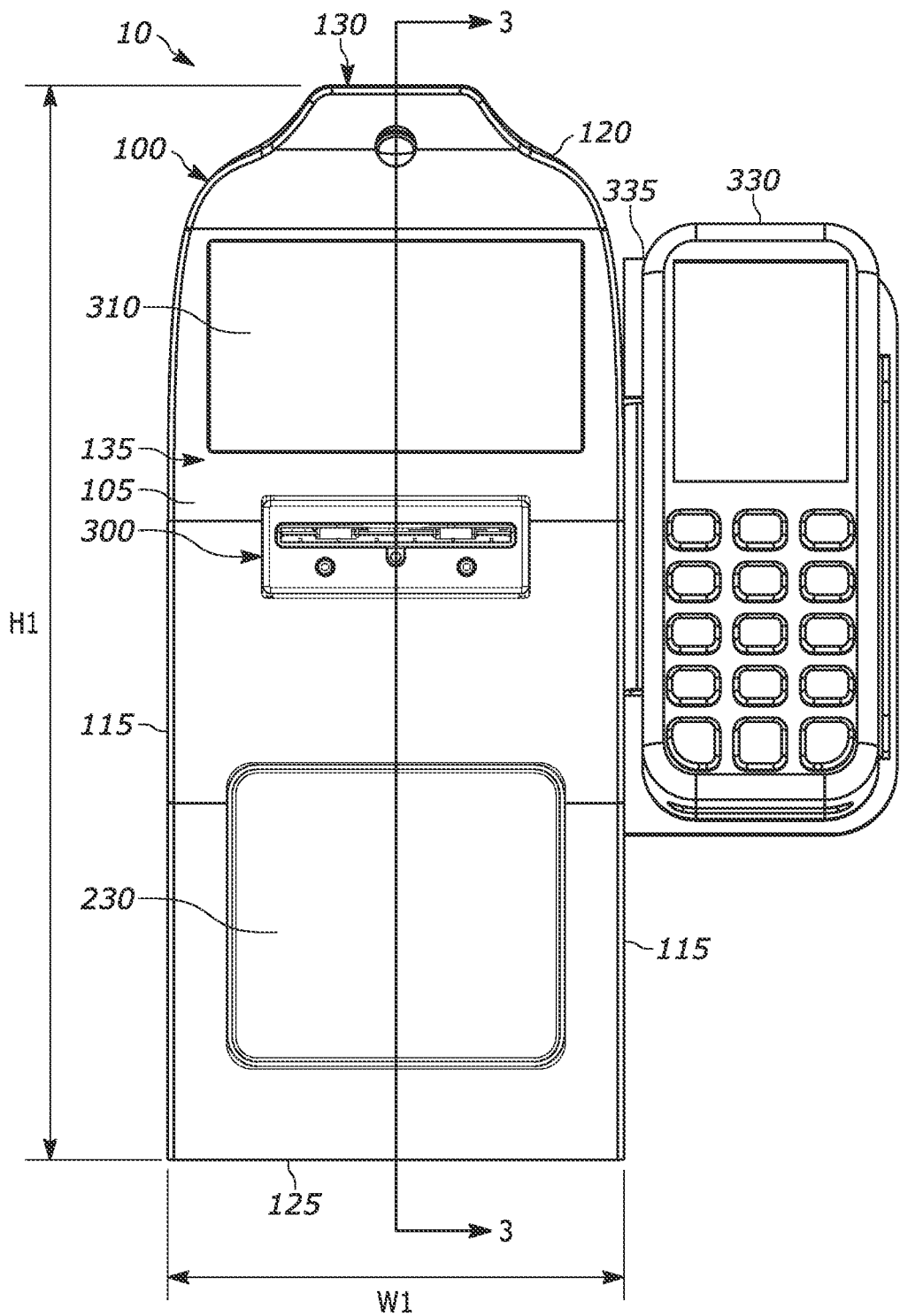
FIG. 2 illustrates a front view of the kiosk of FIG. 1.
Figure 3:
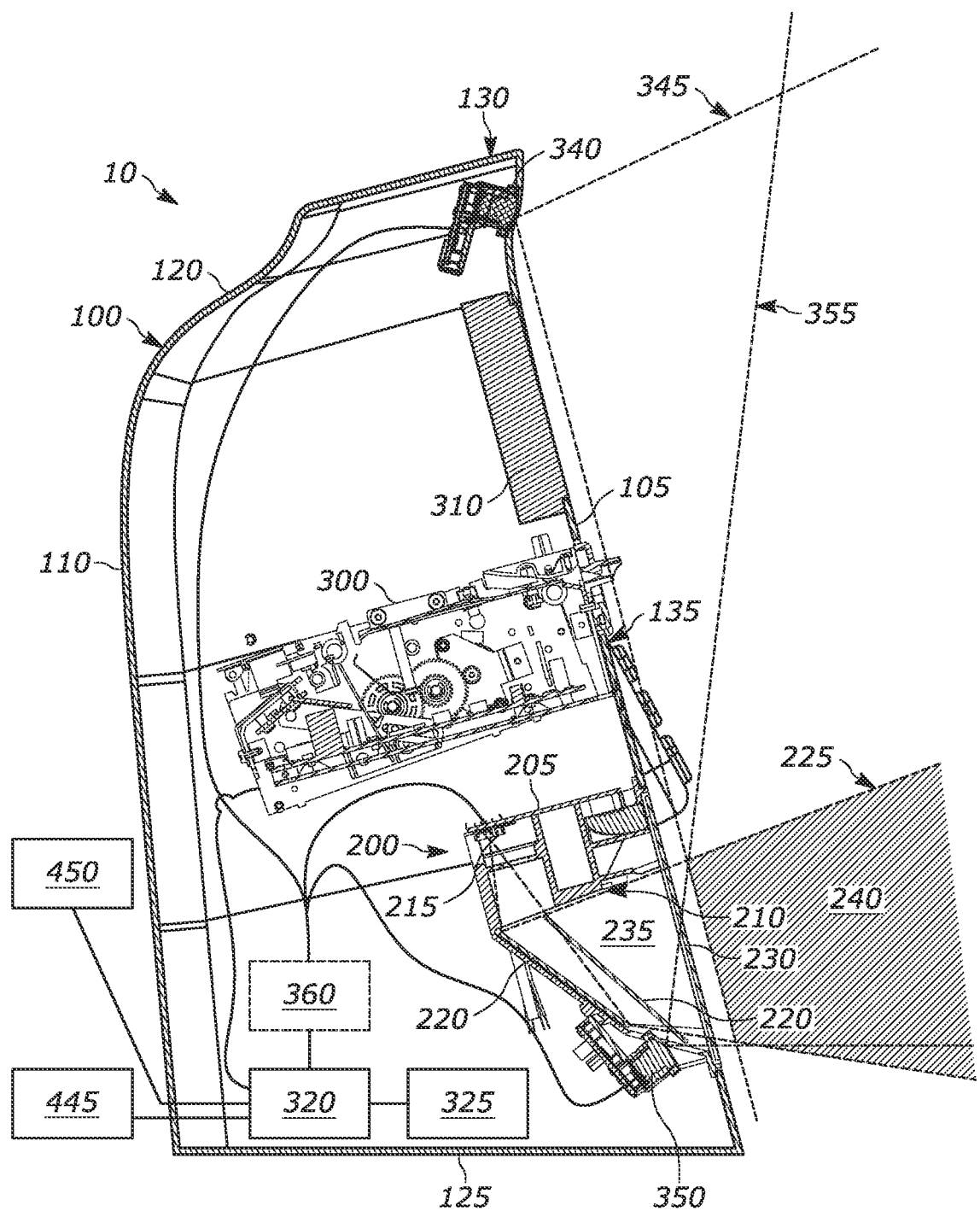
FIG. 3 illustrates a cross-sectional view of the kiosk of FIG. 1, taken along line 3-3 in FIG. 2.

Referring to FIGS. 1-3, an first example self-checkout kiosk 10 is shown having a kiosk housing 100 with a front wall 105 that defines a front surface of kiosk housing 100, rear wall 110, opposing side walls 115, top wall 120, and bottom wall 125. In the example shown, kiosk housing 100 has a width W1 that is less than or equal to 6¾ inches, preferably less than or equal to 5 inches, and a height H1 that is less than or equal to 16 inches.

A barcode reader 200 is positioned within kiosk housing 100 and includes a reader housing 205 with a window 230 configured to allow a light to pass between a product scanning region 240, where the barcodes of products can be read by barcode reader 200, and an interior region 235 of reader housing 205. An imaging assembly 210 within reader housing 205 has an imager 215 and optical components 220, such as mirrors, positioned within interior region 235 that direct a first field-of-view 225 of imaging assembly 210 through window 230 in reader housing 205. Processor 320 is communicatively coupled to barcode reader 200 and is configured to decode barcodes captured by barcode reader 200.

Figure 4:
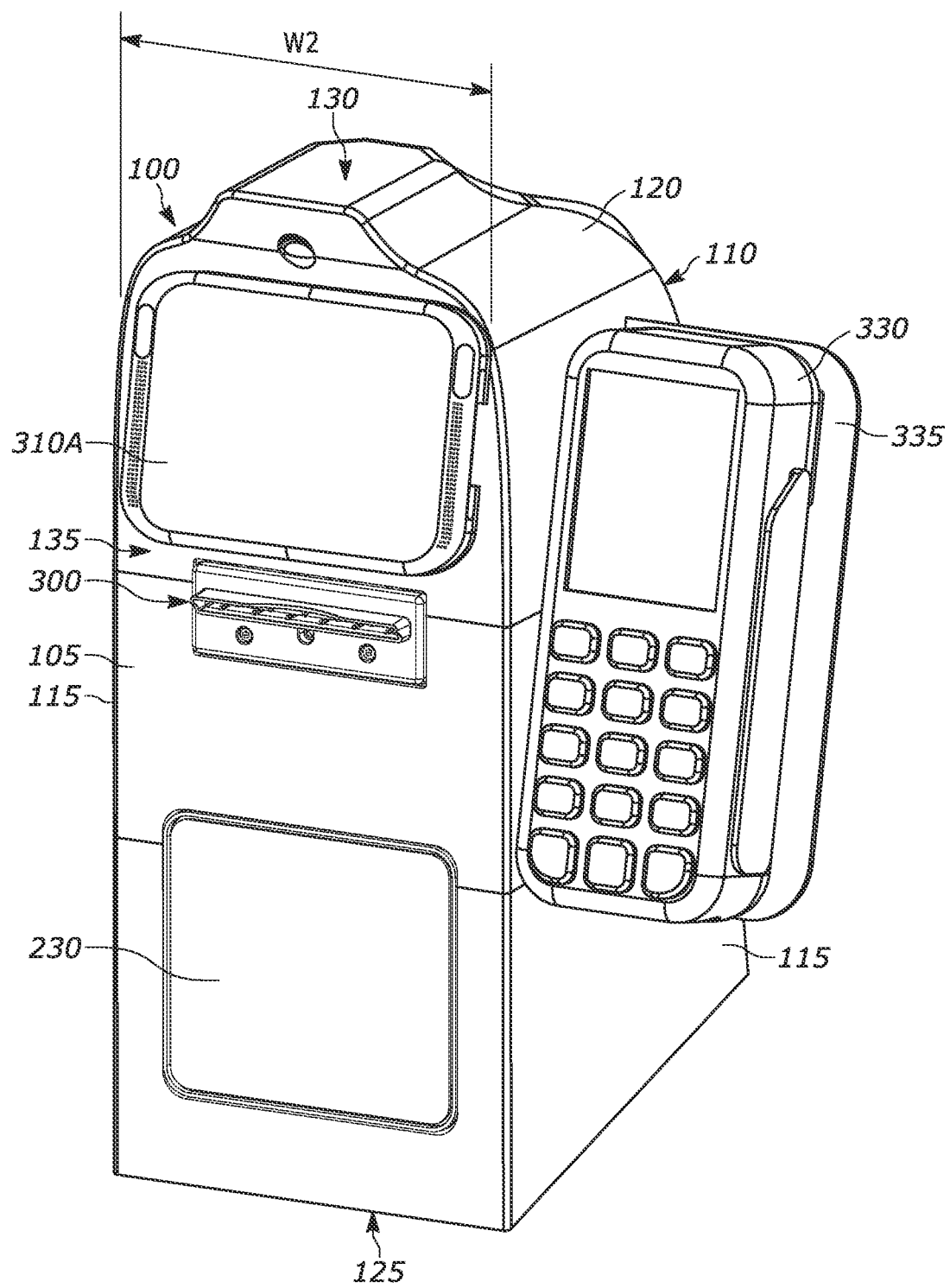
FIG. 4 illustrates a perspective view of the kiosk of FIG. 1 with an alternative external display module.
Figure 5:
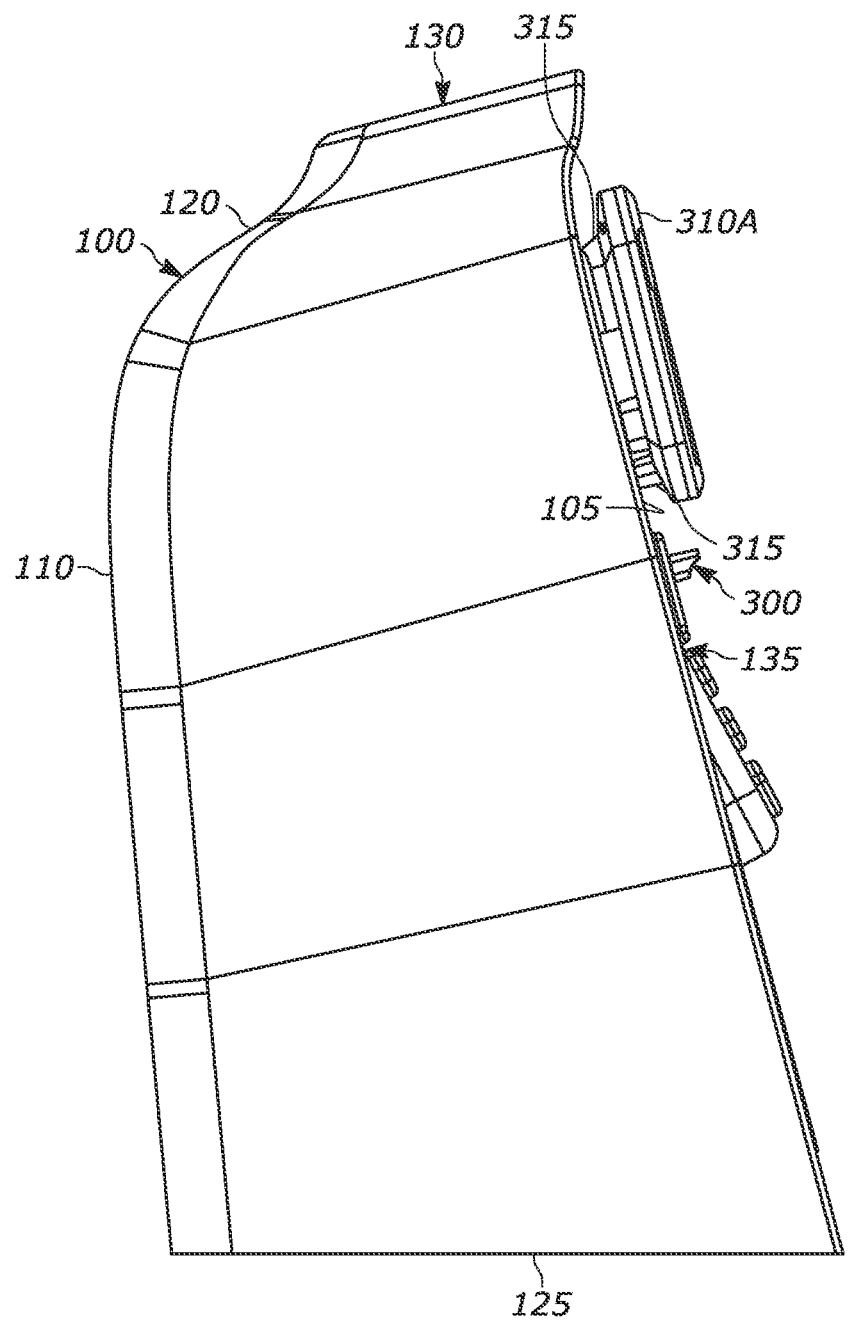
FIG. 5 illustrates a left side view of the kiosk of FIG. 4.

Kiosk 10 also has a receipt printer 300 and a display unit 310. Receipt printer 300 can be used to print receipts, coupons, etc., and is preferably positioned within kiosk housing 100. Alternatively, receipt printer 300 can also be a separate unit that is positioned near kiosk 10 or mounted to kiosk housing 100. As shown in FIGS. 1-3, display unit 310 can be positioned within kiosk housing 100 and barcode reader 200, receipt printer 300, and display unit 310 are vertically aligned along longitudinal axis A of kiosk 10, which allows the footprint of kiosk 10 to be minimized. Alternatively, as shown in FIGS. 4-5, display unit 310A can be a separate unit that is position outside kiosk housing 100 and is removably mounted to an exterior 135 of kiosk housing 100, for example by mounting bracket 315. With display unit 310A mounted to exterior 135 of kiosk housing 100, the overall width W2 of kiosk housing 100 and display unit 310A is preferably less than or equal to 6 inches.

Processor 320 is also preferably positioned within kiosk housing 100, is communicatively coupled to barcode reader 200, receipt printer 300, and display unit 310, 310A, and is configured to decode barcodes captured by barcode reader 200. Processor 320 can also be configured to perform advanced processing, such as facial recognition, object recognition, and gesture recognition, of images received from imaging assembly 210 of barcode reader 200. Preferably, to keep the size and footprint as small as possible, there are no other electronic components, other than processor 320 located within kiosk housing 100 that are communicatively coupled to barcode reader 200, receipt printer 300, or display unit 310, 310A.

Figure 6:
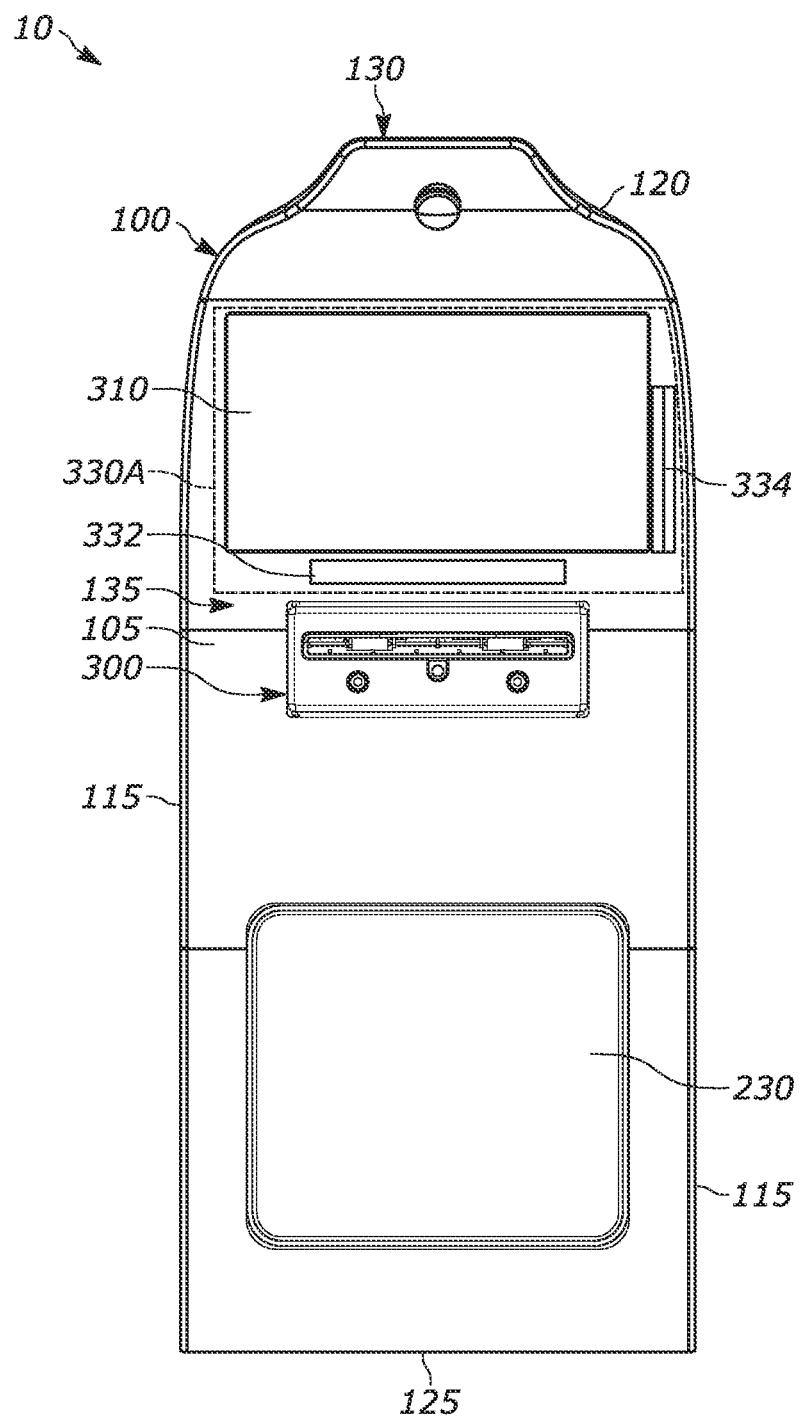
FIG. 6 illustrates a front view of the kiosk of FIG. 1 with an alternative internal payment module.

Kiosk 10 can also include a payment module 330 that can be used to receive card payment for transactions. As shown in FIGS. 1, 2, and 4, payment module 330 can be mounted to kiosk housing 100, for example by mounting bracket 335, and is commutatively coupled to processor 320. Alternatively, as shown in FIG. 6, payment module 330A can also be located within kiosk housing 100 and partially integrated with display unit 310. In the example shown in FIG. 6, a chip reader 332 of payment module 330A for reading the chips of payment cards is positioned within kiosk housing 100 below display unit 310 and a magnetic strip reader 334 of payment module 330A for reading the magnetic strips of payment cards is positioned within kiosk housing 100 to the side of display unit 310. Display unit 310 can then be configured to provide the display (e.g., payment instructions, etc.) and the input (e.g., PIN codes, etc.) for payment module 330A.

To provide additional functionality to kiosk 10, kiosk 10 can also include a vision camera 340, such as a 2 megapixel color camera, positioned within kiosk housing 100 above and in general vertical alignment with barcode reader 200, receipt printer 300, and display unit 310, 310A, as best shown in FIG. 3. Vision camera 340 can be positioned within an upper portion 130 of kiosk housing 100 that extends outward past front wall 105 and upwards from top wall 120, such that at least a portion of vision camera 340 is located forward of front wall 105. Vision camera 340 has a second field-of-view 345 that faces generally downward and overlaps first field-of-view 225 of imaging assembly 210 within product scanning region 240. Two overlapping fields-of-view (first field-of-view 225 of imaging assembly 210 and second field-of-view 345 of vision camera 340) from different angles helps to more accurately identify items for object recognition. Since different sides of an object can be seen by imaging assembly 210 and vision camera 340, the accuracy of item identification in a convolutional neural network system can be greatly improved. To intersect first field-of-view 225 within product scanning region 240 and provide a sufficient view for vision camera 340, vision camera 340 can be positioned more than 12 inches, preferably 14½ inches, above bottom wall 125 of kiosk housing 100 and have a lower boundary that is less than 2 inches from front wall 105 at bottom wall 125 and, preferably, is substantially parallel to front wall 105. Second field-of-view 345 of vision camera 340 can also be oriented to encompass objects that are located adjacent to kiosk 10. This allows kiosk 10 to monitor adjacent payment terminals and for items left in a cart or basket, items left in a bagging area, printed receipts left in a printer, etc. In addition, second field-of-view 345 can also have vertical coverage that is large enough to encompass product scanning region 240 and also to be able to view the facial features of a user of kiosk 10. This allows kiosk 10 to use facial recognition to perform various functions, such as security monitoring, such as capturing the face of a customer along with suspected theft events that are logged, purchase of age restricted items, facial identification payment methods, etc.

By using imaging assembly 210 and vision camera 340, two different sides of each item that is scanned are being viewed and kiosk 10 can perform more confident checks against scan avoidance and ticket switching. For example, if a user of kiosk 10 tries to avoid scanning an item by passing the item above, below, or out of range of first field-of-view 225 of barcode reader 200, vision camera 340 would see the item move past, which could flag a scan avoidance event. In addition, if a user of kiosk 10 covers an item with another item on the side facing barcode reader 200, vision camera 340 would see that the top of the item was different than the front side of the item, which could flag a ticket switching event. When mounted in kiosk housing 100, second field-of-view 345 of vision camera 340 can also encompass the area in front of receipt printer 300 and an alert can be provided if a receipt has not been taken from receipt printer 300. Similarly, second field-of-view 345 of vision camera 340 can be wide enough to encompass the area directly in front of payment module 330, 330A, which allows kiosk 10 to monitor payment module 330, 330A provide an alert if a card is left in payment module 330, 330A.

In some embodiments, if desired, a second vision camera 350 can also be positioned within kiosk housing 100 and positioned below and in general vertical alignment with imaging assembly 210 of barcode reader 200, receipt printer 300, and display unit 310, 310A, as best shown in FIG. 3. Second vision camera 350 can also be a 2 megapixel color camera and can be its own unit or can be part of barcode reader 200. In this embodiment, second vision camera 350 has a third field-of-view 355 that faces generally upward and overlaps first field-of-view 225 of imaging assembly 210 and second field-of-view 345 of vision camera 340 within product scanning region 240. Because third field-of-view 355 of second vision camera 350 faces generally upward, third field-of-view 355 may also be able to view the facial features of a user of kiosk 10, which would also assist in the use of facial recognition to perform various functions, such as security, purchase of age restricted items, facial identification payment methods, etc.

A video processing module 360 can also be communicatively coupled to vision camera 340, second vision camera 350, and processor 320 and configured to and perform advanced processing, such as facial recognition, object recognition, and gesture recognition, of images received from vision camera 340 and second vision camera 350. Video processing module 360 can also be configured to perform advanced processing, such as facial recognition, object recognition, and gesture recognition, of images received from imaging assembly 210 of barcode reader 200. With second field-of-view 345 oriented to encompass objects that are located adjacent to kiosk 10, video processing module 360 can also be configured to recognize that an object is located adjacent kiosk 10, for example in a cart, basket, or bagging area, from the images received from vision camera 340, determine if a user is attempting to complete a transaction, and provide an alert if the user is attempting to complete the transaction with an object detected adjacent kiosk 10 that has not been scanned. Alternatively, video processing module 360 may not be required and processor 320 can be configured to perform the advanced processing discussed above.

Figure 7:
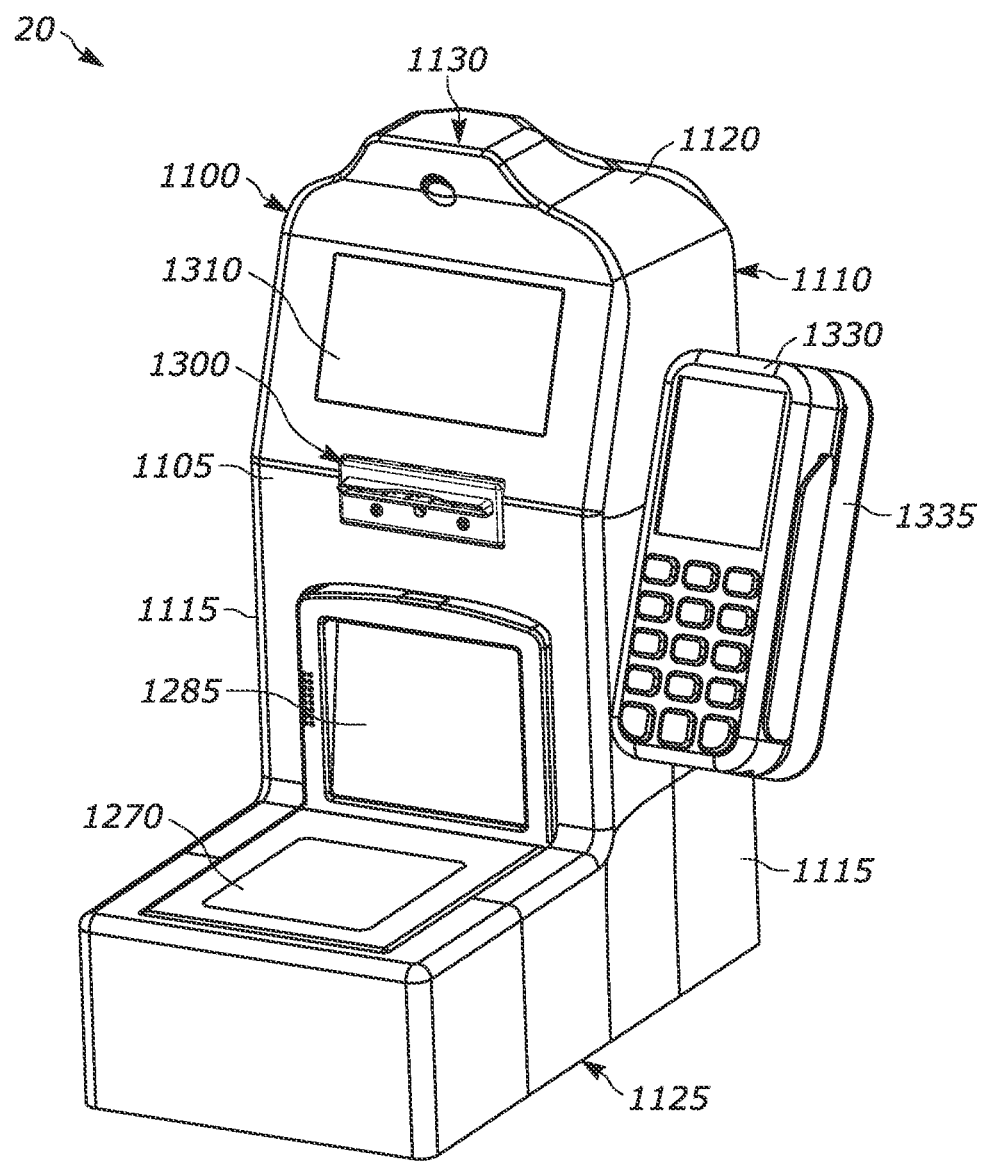
FIG. 7 illustrates a perspective view of a second example kiosk.
Figure 8:
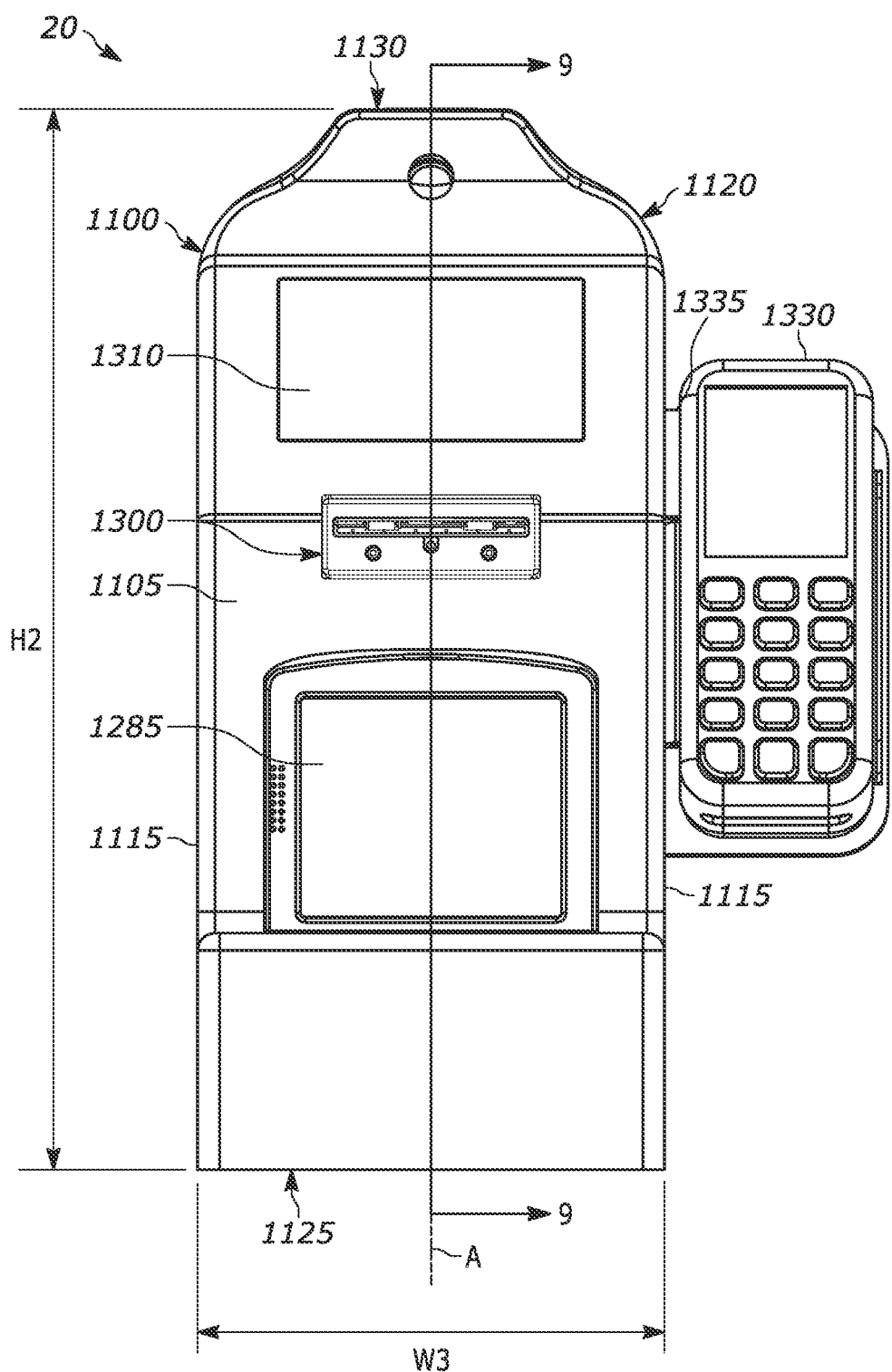
FIG. 8 illustrates a front view of the kiosk of FIG. 7.
Figure 9:
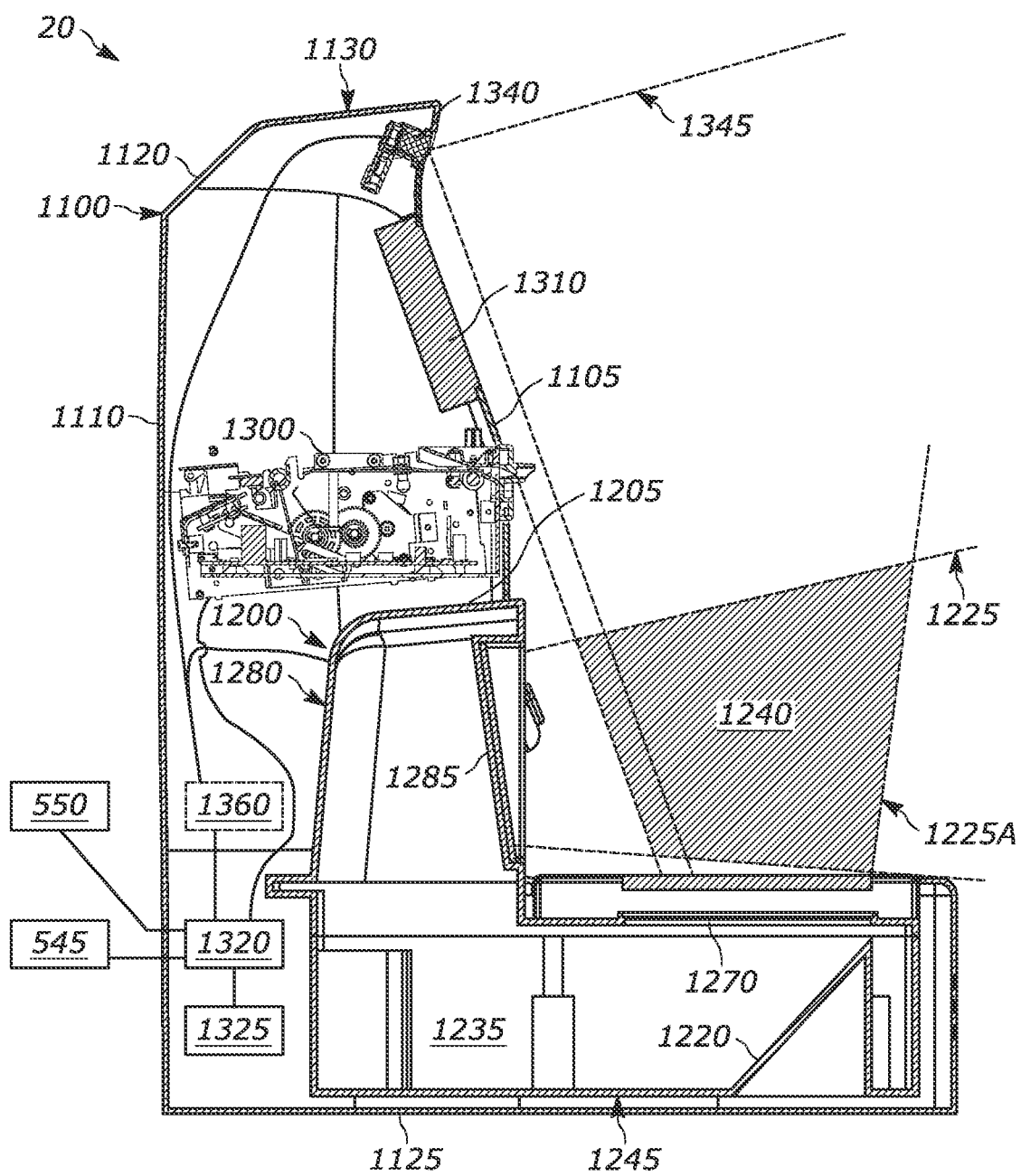
FIG. 9 illustrates a cross-sectional view of the kiosk of FIG. 7, taken along line 9-9 in FIG. 8.

Referring to FIGS. 7-9, a second example self-checkout kiosk 20 is shown having a kiosk housing 1100 with a front wall 1105 that defines a front surface of kiosk housing 100, rear wall 1110, opposing side walls 1115, top wall 1120, and bottom wall 1125. In the example shown, kiosk housing 1100 has a width W3 that is less than or equal to 9 inches and a height H2 that is less than or equal to 17 inches.

Figure 10:
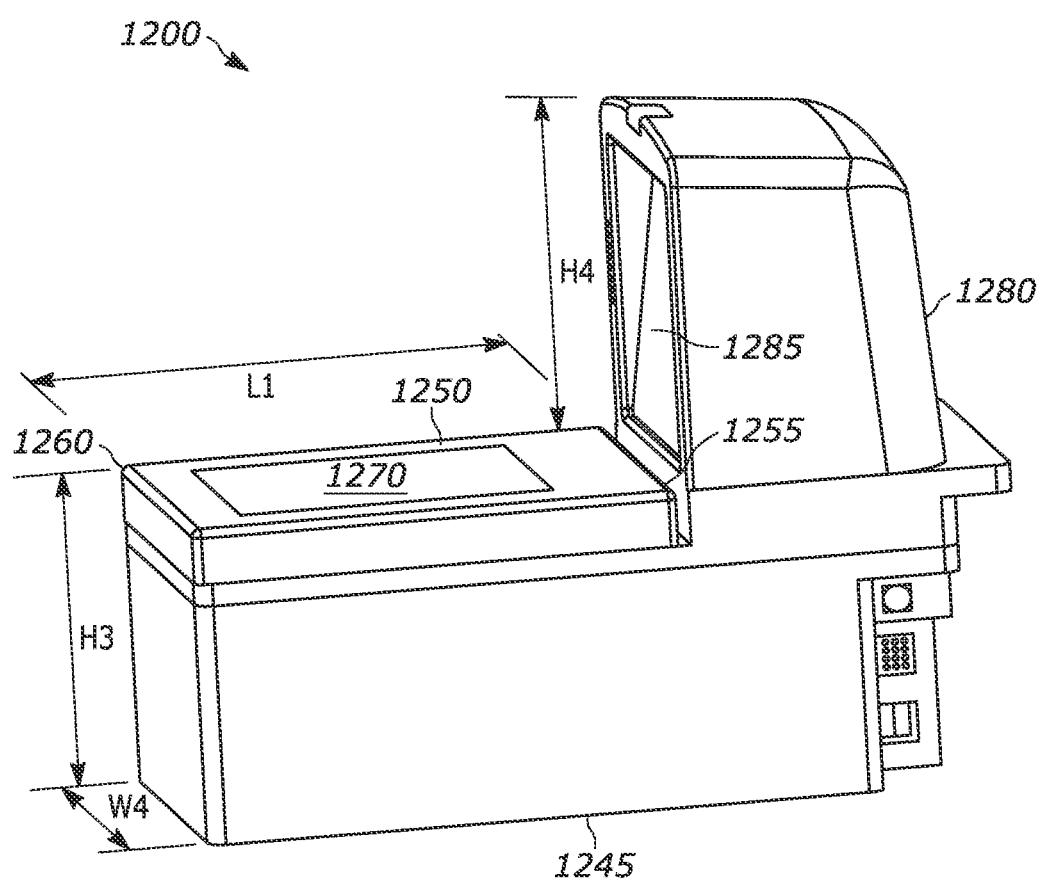
FIG. 10 illustrates a perspective view of the barcode reader of the kiosk of FIG. 7.

A bioptic barcode reader 1200 is positioned within kiosk housing 100 and, as best seen in FIG. 10, includes a reader housing 1205 having a lower housing portion 1245 with an upper surface 1250 facing a product scanning region 1240, where the barcodes of products can be read by barcode reader 1200, and an upper housing portion 1280 extending above lower housing portion 1245. Reader housing 1205 has a width W4 that is greater than or equal to 5 inches and less than or equal to 7½ inches, lower housing portion 1245 has a height H3 that is greater than or equal to 3 inches, and upper housing portion 1280 has a height H4 that is greater than or equal to 4 inches and less than or equal to 6 inches. Upper surface 1250 of lower housing portion 1245 has a length L1 between a proximal edge 1255 adjacent upper housing portion 1280 to a distal edge 1260, opposite proximal edge 1255, that is greater than or equal to 6 inches and less than or equal to 8 inches. A generally horizontal window 1270 is positioned at upper surface 1250 of lower housing portion 1245 and is configured to allow a first light to pass between product scanning region 1240 and an interior region 1235 of reader housing 1205. A generally upright window 1285 is positioned in upper housing portion 1280 and is configured to allow a second light to pass between product scanning region 1240 and interior region 1235. An imaging assembly within reader housing 1205 has an imager and optical components 1220, such as mirrors, positioned within interior region 1235 that direct fields-of-view 1225, 1225A of the imaging assembly through horizontal window 1270 and upright window 1285. Processor 1320 is communicatively coupled to barcode reader 1200 and is configured to decode barcodes captured by barcode reader 1200.

Kiosk 20 also has a receipt printer 1300 and a display unit 1310. Receipt printer 1300 can be used to print receipts, coupons, etc., and is preferably positioned within kiosk housing 1100. Alternatively, receipt printer 1300 can also be a separate unit that is positioned near kiosk or mounted to kiosk housing 1100. As shown, display unit 1310 can be positioned within kiosk housing 1100 and barcode reader 1200, receipt printer 1300, and display unit 1310 are vertically aligned along longitudinal axis A of kiosk 20, which allows the footprint of kiosk 20 to be minimized. Alternatively, the display unit can be a separate unit that is position outside kiosk housing 1100 and is removably mounted to kiosk housing 1100, as discussed above.

Processor 1320 is also preferably positioned within kiosk housing 1100, is communicatively coupled to barcode reader 1200, receipt printer 1300, and display unit 1310, and is configured to decode barcodes captured by barcode reader 1200. Processor 1320 can also be configured to perform advanced processing, such as facial recognition, object recognition, and gesture recognition, of images received from the imaging assembly of barcode reader 1200. Preferably, to keep the size and footprint as small as possible, there are no other electronic components, other than processor 1320 located within kiosk housing 1100 that are communicatively coupled to barcode reader 1200, receipt printer 1300, or display unit 1310.

Figure 11:
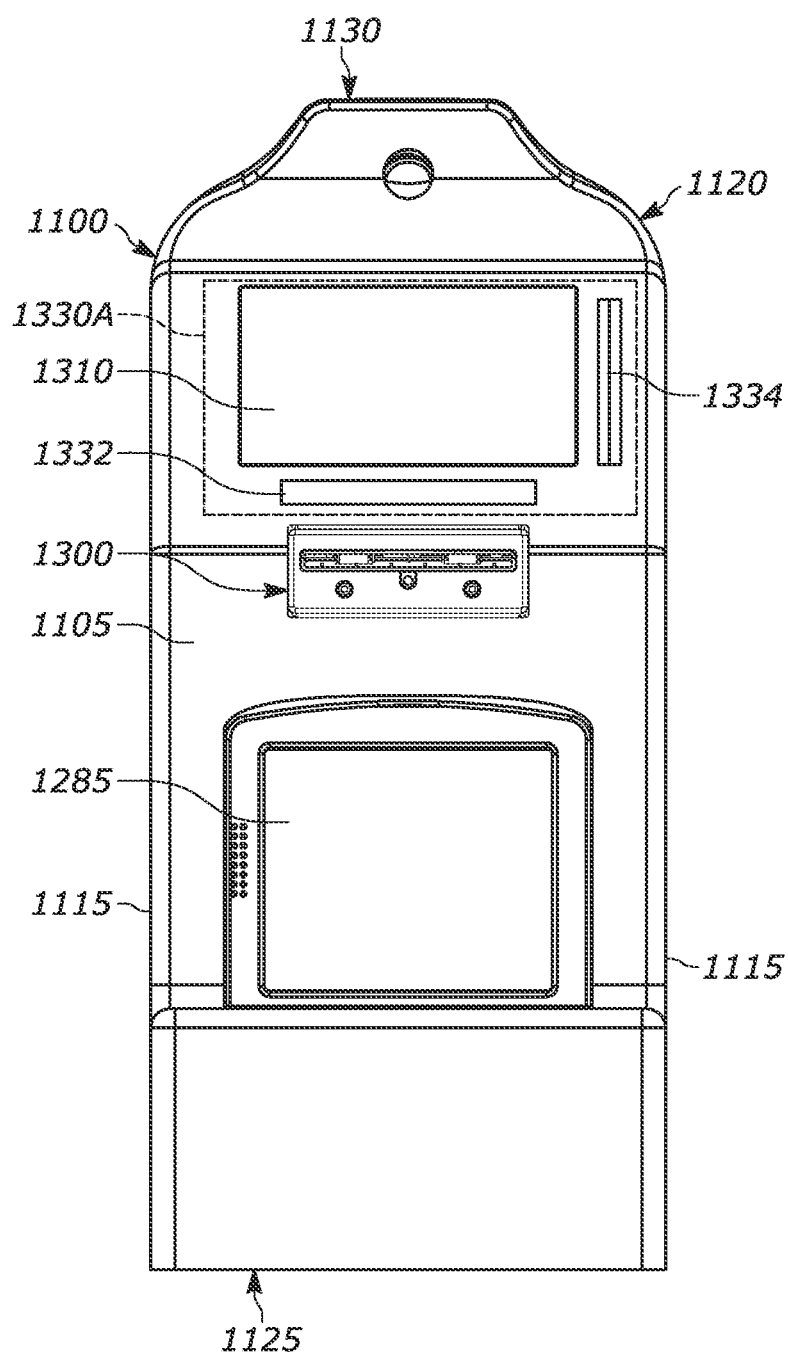
FIG. 11 illustrates a front view of the kiosk of FIG. 7 with an alternative internal payment module.

Kiosk 20 can also include a payment module 1330 that can be used to receive card payment for transactions. Payment module 1330 is preferably mounted to kiosk housing 1100, for example by mounting bracket 1335, and is commutatively coupled to processor 1320. Alternatively, as shown in FIG. 11, payment module 1330A can also be located within kiosk housing 1100 and be positioned in general vertical alignment with barcode reader 1200, receipt printer 1300, and display unit 1310.

To provide additional functionality to kiosk 20, kiosk 20 can also include a vision camera 1340, such as a 2 megapixel color camera, positioned within kiosk housing 1100 above and in general vertical alignment with barcode reader 1200, receipt printer 1300, and display unit 1310, as shown in FIG. 9. Vision camera 1340 can be positioned within an upper portion 1130 of kiosk housing 1100 that extends outward past front wall 1105 and upwards from top wall 1120, such that at least a portion of vision camera 1340 is located forward of front wall 1105. Vision camera 1340 has a second field-of-view 1345 that faces generally downward and overlaps first fields-of-view 1225, 1225A of barcode reader 1200 within product scanning region 1240. The overlapping fields-of-view from different angles helps to more accurately identify items for object recognition, as discussed above. Since different sides of an object can be seen by barcode reader 1200 and vision camera 1340, the accuracy of item identification in a convolutional neural network system can be greatly improved. Second field-of-view 1345 of vision camera 1340 can also be oriented to encompass objects that are located adjacent to kiosk 20, as discussed above, which allows kiosk 20 to monitor adjacent payment terminals and for items left in a cart or basket, items left in a bagging area, printed receipts left in a printer, etc. In addition, second field-of-view 1345 can also have vertical coverage that is large enough to encompass product scanning region 1240 and also to be able to view the facial features of a user of kiosk 20.

As discussed in detail above, by using barcode reader 1200 and vision camera 1340, different sides of each item that is scanned are being viewed and kiosk 20 can perform more confident checks against scan avoidance and ticket switching, provide an alert if a receipt has not been taken from receipt printer 1300, and provide an alert if a card is left in payment module 1330, 1330A.

A video processing module 1360 can also be communicatively coupled to vision camera 1340 and processor 1320 and configured to and perform advanced processing, such as facial recognition, object recognition, and gesture recognition, of images received from vision camera 1340. Video processing module 1360 can also be configured to perform advanced processing, such as facial recognition, object recognition, and gesture recognition, of images received from barcode reader 1200. Alternatively, video processing module 1360 may not be required and processor 1320 can be configured to perform the advanced processing discussed above.

In addition to having a smaller size and reduced footprint, kiosks 10, 20 can also be incorporated into assemblies that allow all the aspects (display, scanner, receipt printer, payment terminal, etc.) of kiosks 10, 20 to be quickly rotated to face either the cashier or the customer, as needed, without complicated mechanisms. This allows for quick and easy conversion between a traditional cashier point-of-sale system and a self-checkout kiosk. In addition, the assemblies with kiosks 10, 20 can be oriented to face a cashier for scanning of items and rotated to face a customer for review and payment. The assemblies can also be oriented sideways between the cashier and customer so both can scan, review, and/or complete payment during a transaction.

Figure 12:
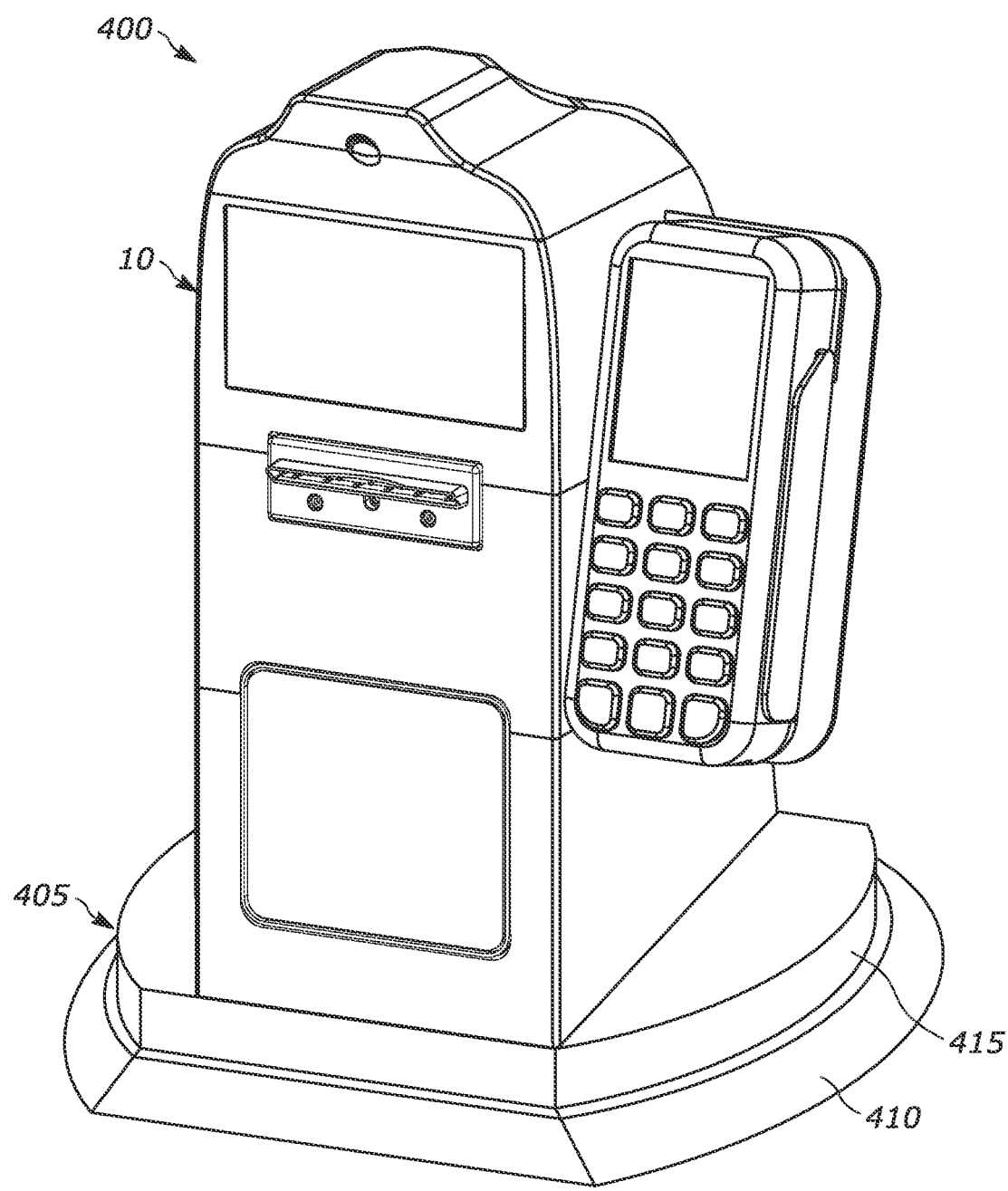
FIG. 12 illustrates a perspective view of a first example assembly with the kiosk of FIG. 1.
Figure 13:
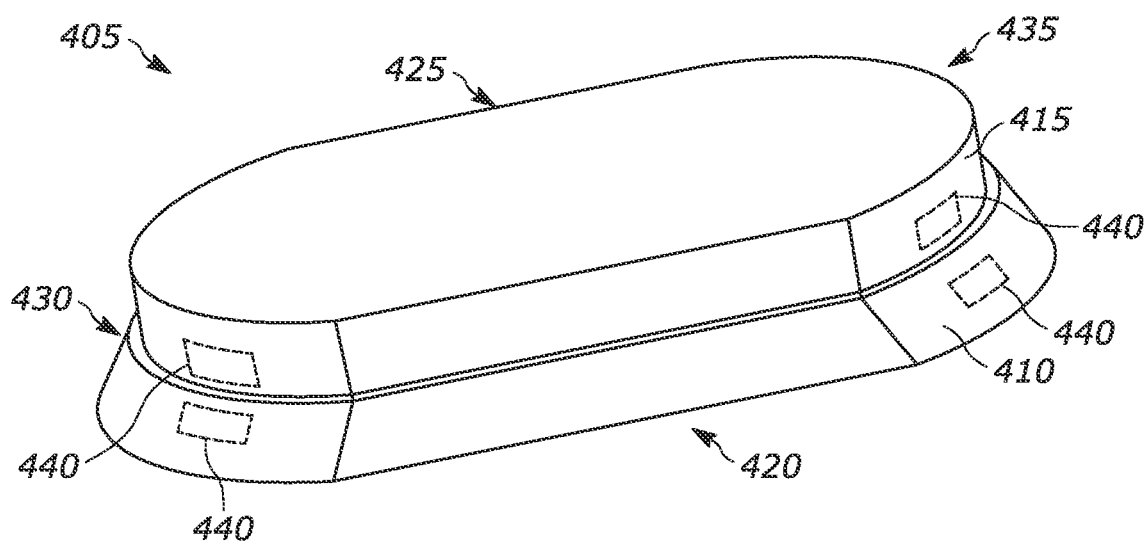
FIG. 13 illustrates a perspective view of the base of the assembly of FIG. 12.
Figure 14:
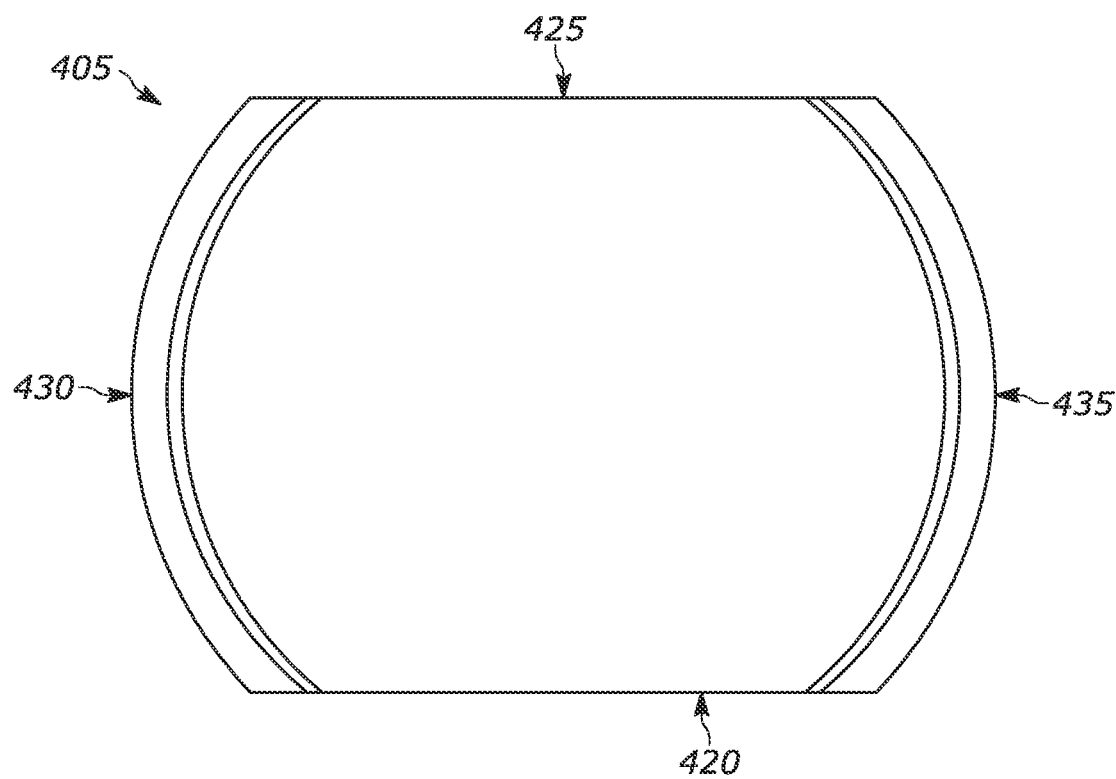
FIG. 14 illustrates a top view of the base of the assembly of FIG. 12.

Referring to FIGS. 12-14, a first example assembly 400 is shown that includes kiosk 10 mounted to a rotatable base 405, such that kiosk 10 is rotatable with base 405 without any vertical movement of kiosk 10. Base 405 could be pre-integrated into kiosk 10 or could be adapted to accept and be secured to kiosk 10. Base 405 includes a bottom portion 410 that can be placed on and/or secured to a counter or other workspace and a top portion 415 that is rotatably mounted to bottom portion 410 via a bearing (not shown) or other mechanism located between bottom portion 410 and top portion 415 so that top portion 415 is rotatable relative to bottom portion 410. As best seen in FIGS. 13 and 14, base 405 in the particular example shown has a first planar side 420 that is generally parallel to front wall 105 of kiosk housing 100, a second planar side 425 that is generally parallel to rear wall 110 of kiosk housing 100 and opposite first planar side 420, and opposing first and second arcuate sides 430, 435 that extend between and interconnect first and second planar sides 420, 425. First and second planar sides 420, 425 allow assembly 400 to fit in narrower counter spaces. Alternatively, first and second planar sides 420, 425 are not required and base 405 can be generally cylindrical all the way around the circumference of base 405.

Figure 15:
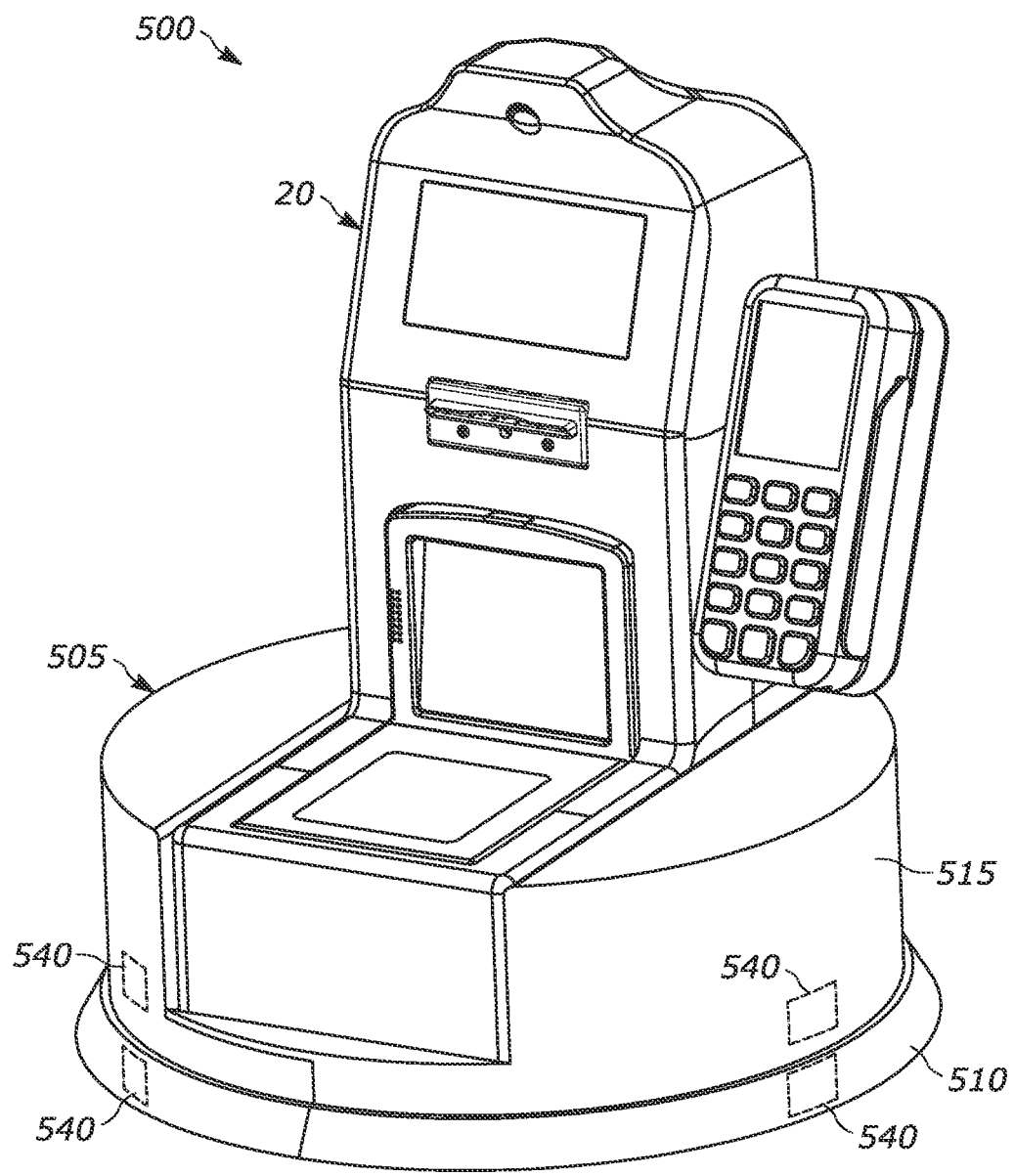
FIG. 15 illustrates a perspective view of a second example assembly with the kiosk of FIG. 7.

Referring to FIG. 15, a second example assembly 500 is shown that includes kiosk 20 mounted a rotatable base 505, such that kiosk 20 is rotatable with base 505 without any vertical movement of kiosk 20. Base 505 could be pre-integrated into kiosk 20 or could be adapted to accept and be secured to kiosk 20. Base 505 includes a bottom portion 510 that can be placed on and/or secured to a counter or other workspace and a top portion 515 that is rotatably mounted to bottom portion 510 via a bearing (not shown) or other mechanism located between bottom portion 510 and top portion 515 so that top portion 515 is rotatable relative to bottom portion 510. In the particular example shown in FIG. 13, base 505 is generally cylindrical all the way around the circumference of base 505. Alternatively, base 505 can also have opposing front and rear planar sides, as discussed above for base 405.

Bases 405, 505 can also have sensors 440, 540, such as hall effect sensors, light beam breaking sensors, rotational position sensors, geomagnetic sensors, optical sensors, and gyroscopes, that can be used to determine the rotational position of kiosks 10, 20 and processors 320, 1320 of kiosks 10, 20 could be communicatively coupled to sensors 440, 540 to allow processors 320, 1320 to determine the rotational position of kiosks 10, 20. Alternatively, or in addition to sensors 440, 540, if kiosks 10, 20 have vision cameras 340, 1340, processors 320, 1320 can also be configured to determine the rotational position of kiosks 10, 20 based on images received from vision cameras 340, 1340. For example, processors 320, 1320 could be calibrated to recognize features in the store or targets placed on the counter and/floor around the kiosks 10, to determine the rotational positions of kiosks 10, 20.

Figure 16A:
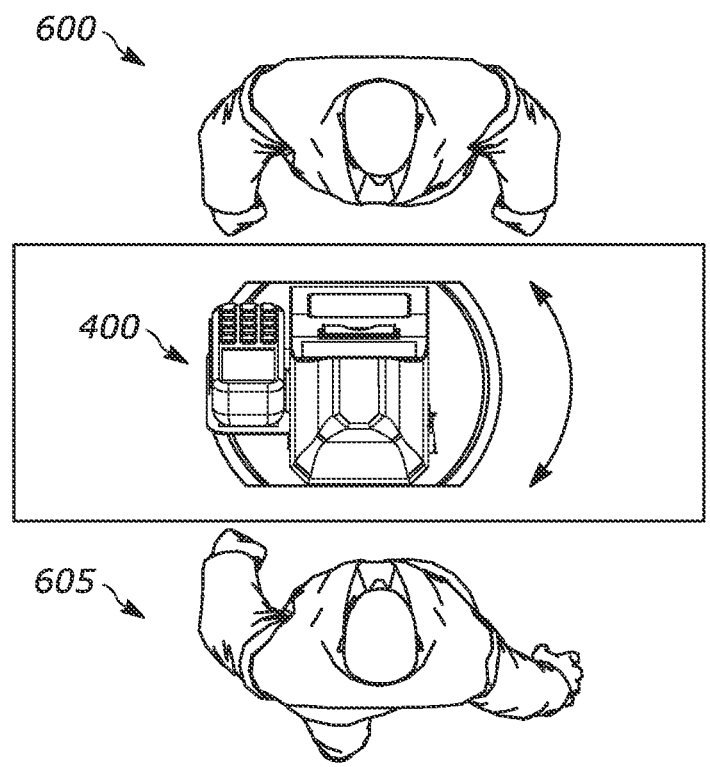
FIG. 16A illustrates the kiosk of FIG. 1 in a point-of-sale mode.
Figure 16B:
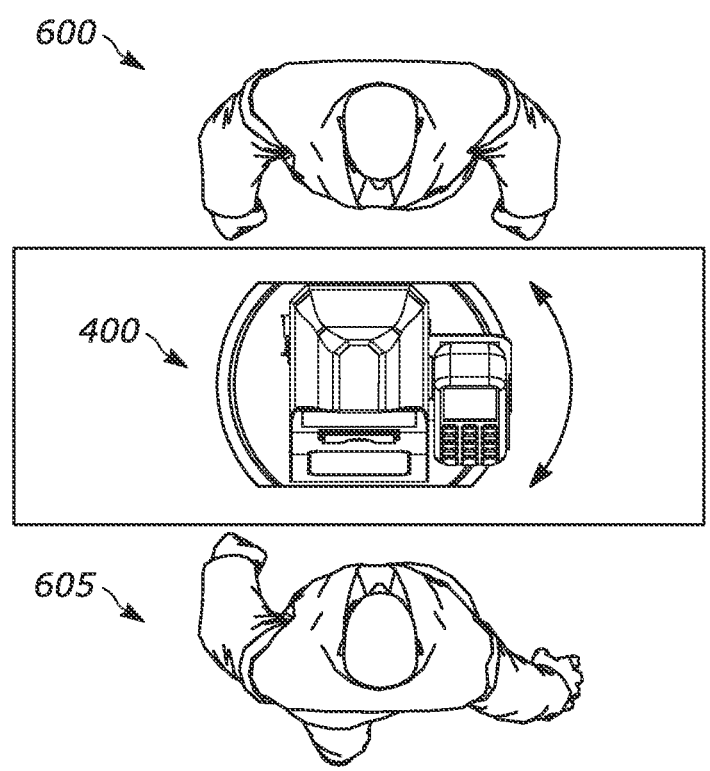
FIG. 16B illustrates the kiosk of FIG. 1 in a self-checkout mode.

Whether sensors 440, 540 or vision cameras 340, 1340 are used to determine the rotational position of kiosks 10, 20, kiosks 10, 20 can also have a memory 325, 1325 that is communicatively coupled to processors 320, 1320 (or to processors 320, 1320 through video processing modules 360, 1360 that are communicatively coupled to vision cameras 340, 1340 and processors 320, 1320) that includes a plurality of computer executable instructions that, when executed by processors 320, 1320, can automatically perform various functions based on the rotational position of kiosks 10, 20. For example, kiosks 10, 20 can be automatically switched between a point-of-sale mode when kiosks 10, 20 are in a first rotational position with kiosks 10, facing towards an employee 600 or cashier (FIG. 16A) and a self-checkout mode when kiosks 20 are in a second rotational position with kiosks 10, 20 facing towards a customer 605 (FIG. 16B). In the point-of-sale mode, barcode readers 200, 1200 could be activated, payment modules 330, 330A, 1330, 1330A could be deactivated, and advanced processing of images, such as facial recognition, could be deactivated since employee 600 is operating kiosks 10, 20 and processors 320, 1320 can activate payment modules 330, 330A, 1330, 1330A and activate facial recognition processing when kiosks 10, 20 are rotated to self-checkout mode. In addition, cash drawers 445, 545 associated with each assembly 400, 500 could be unlocked in point-of-sale mode so they can be accessed by employee 600 and processors 320, 1320 can send an instruction to lock cash drawers 445, 545 when kiosks 10, 20 are switched to self-checkout mode and/or processors 320, 1320 can also send an instruction to illuminate a remote indicator light 450, 550 when switched from point-of-sale mode to self-checkout mode to alert customers 605 that particular kiosks 10, are available for self-checkout. The plurality of computer executable instructions, when executed by processors 320, 1320, could also be programmed to perform any number of other functions based on the rotational position of kiosks 10, 20, such as, changing the user interface on display units 310, 310A, 1310, 1310A between a point-of-sale mode interface and self-checkout mode interface, activating speaker based instructions when kiosks 10, 20 are switched to self-checkout mode, activation of remote indicator lights 450, 550 when kiosks 10, 20 are switched to self-checkout mode and/or point-of-sale mode, changing barcode readers 200, 1200 from a swipe mode to a presentation mode when kiosks are switched from point-of-sale mode to self-checkout mode, changing a wake up system and/or parameters to avoid eye annoyance of customer 605 when switched to self-checkout mode, prompting employee to login when switched from self-checkout mode to point-of-sale mode, activating facial recognition to login a cashier when switched to point-of-sale mode, activating facial recognition to verify payment or verify purchase of an age restricted item when switched to self-checkout mode, and/or using the images received from vision cameras 340, 1340 to watch for security events (e.g., sweethearting, scan avoidance, etc.). If desired, kiosks 10, 20 could also be automatically switched to a hybrid mode when kiosks 10, 20 are rotated and positioned between the first and second rotational positions to allow kiosks 10, 20 to be jointly used by the cashier and customer. In the hybrid mode, there could be a combination of the functionality described above activated since both the cashier and customer are using kiosks 10, 20. For example, barcode readers 200, 1200 and payment modules 330, 330A, 1330, 1330A could both be activated since both the cashier and customer are using kiosks 10, 20, advanced processing of images, such as facial recognition, could be also be activated since the customer is using kiosks 10, 20, and cash drawers 445, 545 associated with each assembly 400, 500 could be unlocked so they can still be accessed by employee 600.

With the ability of kiosks 10, 20 to rotate within assemblies 400, 500 and to determine the rotational position of kiosks 10, 20, additional functionality can also be incorporated into assemblies 400, 500. For example, an additional rear facing vision camera could be added to kiosks 10, 20 and kiosks 10, 20 could be configured to automatically detect the presence or absence of employee 600 in the vicinity of kiosks 10, 20. A motor can also be incorporated into bases 405, 505 that can automatically rotate kiosks 10, 20 between point-of-sale mode and self-checkout mode based on the presence or absence of employee 600. This allows kiosks 10, 20 to be automatically converted from an employee operated point-of-sale station to a self-checkout station, even if employee leaves and forgets to switch kiosks 10, 20 to self-checkout mode, thus automatically maximizing the number of usable self-checkout locations available to customers. Kiosks 10, 20 can then also automatically switch and rotate back to point-of-sale mode when the presence of employee 600 is again detected. In order to account for employee 600 momentarily stepping outside of the field-of-view of kiosks 10, 20, for example to retrieve something, kiosks 10, 20 could also be configured with a time limit associated with the lack of presence of employee 600, before a decision to convert to self-checkout mode is made.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method. Also, at least some of the figures may or may not be drawn to scale.

The benefits, advantages, solutions to problems, and any element(s) that may cause any benefit, advantage, or solution to occur or become more pronounced are not to be construed as a critical, required, or essential features or elements of any or all the claims. The legal scope of the property right is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s).

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A kiosk, comprising:
a kiosk housing having a width less than or equal to 9 inches;
a barcode reader within the kiosk housing, the barcode reader comprising a reader housing having a lower housing portion with an upper surface facing a product scanning region and an upper housing portion extending above the lower housing portion, a horizontal window positioned at the upper surface of the lower housing portion and configured to allow a first light to pass between the product scanning region and an interior region of the reader housing, an upright window positioned in the upper housing portion and configured to allow a second light to pass between the product scanning region and the interior region of the reader housing, where the reader housing has a width that is greater than or equal to 5 inches and less than or equal to 7½ inches, the lower housing portion has a height that is greater than or equal to 3 inches, the upper housing portion has a height that is greater than or equal to 4 inches and less than or equal to 6 inches, and the upper surface of the lower housing portion has a length between a proximal edge adjacent the upper housing portion and a distal edge that is opposite the proximal edge, the length is greater than or equal to 6 inches and less than or equal to 8 inches;
a receipt printer within the kiosk housing;
a display unit; and
a processor within the kiosk housing, the processor communicatively coupled to the barcode reader, the receipt printer, and the display unit.

2. The kiosk of claim 1, wherein the display unit is positioned within the kiosk housing.

3. The kiosk of claim 2, wherein the barcode reader, the receipt printer, and the display unit are vertically aligned.

4. The kiosk of claim 3, wherein a height of the kiosk housing is less than or equal to 17 inches.

5. The kiosk of claim 2, wherein there are no other electronic components located within the kiosk housing that are communicatively coupled to barcode reader, the receipt printer, or the display unit.

6. The kiosk of claim 1, comprising:
a vision camera positioned within the kiosk housing and above the barcode reader, the receipt printer, and the display unit; and
a video processing module communicatively coupled to the vision camera and the processor; wherein
a first field-of-view of the barcode reader and a second field-of-view of the vision camera overlap in the product scanning region.

7. The kiosk of claim 1, comprising a payment module.

8. The kiosk of claim 7, wherein the payment module is within the kiosk housing and is partially integrated with the display unit.

9. The kiosk of claim 1, wherein the kiosk is mounted to a rotatable base and the kiosk is rotatable with the rotatable base without any vertical movement of the kiosk.

* * * * *